Patented Aug. 21, 1928.

1,681,861

UNITED STATES PATENT OFFICE.

ANGELO KNORR, OF BERLIN, AND GERHARD STEIMMIG, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY.

PROCESS OF A MANUFACTURE OF DIOXAN.

No Drawing. Application filed August 6, 1926, Serial No. 127,706, and in Germany December 23, 1924.

Dioxan

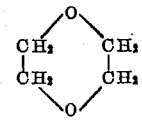

has been prepared by Faworski (see Chem. Zentralblatt 1907, I, page 15) by distillation of 25 parts of glycol with 1 part of concentrated sulphuric acid. By this method at the end of the reaction resinous bodies, acetaldehyde and other byproducts are formed.

Now we have found that these inconveniences may be avoided and the yield and purity of dioxan may be increased by adding to the mixture of glycol with one of the usual catalysts employed in the manufacture of ethylether, e. g. sulphuric acid, benzene-sulphonic acid, phosphoric acid, zinc chloride etc., glycol in the same quantity as dioxan distills off. Instead of glycol the ethers derived from glycol may be employed, e. g. dihydroxydiethyloxide of the formula:

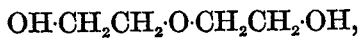

the intermediate product in converting glycol into dioxan, and dihydroxydiethyloxide-monoethylether of the formula:

and in general compounds which correspond to the formula:

X meaning an univalent radicle such as H.—$CH_2CH_2$—OH.—$CH_2CH_2$·O·alkyl. By this continuous process practically unlimited quantities of glycol may be converted into dioxan with aid of the quantity of the catalyst calculated for one charge.

To illustrate our invention the following examples are given, the parts being by weight:

*Example 1.*—A mixture of 25 parts of glycol and 1 part of concentrated sulphuric acid is heated to boiling in a suitable vessel, glycol being added in the same quantity as dioxan distills off. The crude yield corresponds to the glycol used.

If one starts with a charge of 400 g. of glycol the process may be continued in the described manner for a practically unlimited time; the reaction does not stop, e. g. if 50 times the weight of the glycol used for the starting charge is converted into dioxin.

*Example 2.*—25 parts of dihydroxydiethyloxide are heated with 1 part of concentrated sulphuric acid whilst stirring. Dihydroxydiethyloxide is added in the same quantity as dioxan distills off.

*Example 3.*—25 parts of dihydroxydiethyl-oxidemonoethylether are heated to boiling with 1 part of concentrated sulphuric acid, the temperature of the distilling vapours not exceeding about 110° C. Dihydroxydiethyl-oxidemonoethylether is added in the quantity as dioxan distills off.

It is obvious to all skilled in the art that the invention is not limited to the details given in the foregoing examples. E. g., mixtures of the aforesaid starting materials or other catalysts may be used.

What we claim is:

1. A process of a manufacture of dioxan in a continuous operation which consists in heating in the presence of a catalyst used in the manufacture of ethylether compounds of the general formula:

wherein X represents a univalent radicle of the group

—H, —$CH_2·CH_2OH$, and —$CH_2·CH_2O$ alkyl and in adding to the boiling mixture the starting material in the same quantity as dioxan distills off.

2. A process of a manufacture of dioxan in a continuous operation which consists in heating glycol in the presence of a catalyst used in the manufacture of ethylether and in adding to the boiling mixture glycol in the same quantity as dioxan distills off.

3. A process of manufacture of dioxan in a continuous operation which consists in heating glycol in the presence of concentrated sulphuric acid and in adding to the boiling mixture glycol in the same quantity as dioxan distills off.

In testimony whereof we affix our signatures.

ANGELO KNORR.
GERHARD STEIMMIG.